Patented Dec. 17, 1940

2,225,013

UNITED STATES PATENT OFFICE 2,225,013

DYESTUFFS OF THE ANTHRAQUINONE SERIES AND PROCESS OF MAKING SAME

Walter Kern, Sissach, Switzerland, assignor to the firm Society of Chemical Industry in Basle, Basel, Switzerland No Drawing. Application May 9, 1938, Serial No. 206,926. In Switzerland May 11, 1937

11 Claims. (Cl. 260—374)

This invention relates to the manufacture of dyestuffs of the anthraquinone series by causing an anthraquinone of the general formula

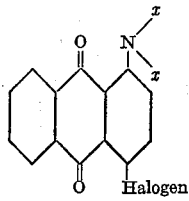

which may contain sulfonic acid groups as substituents and wherein each $x$ is hydrogen or a hydrocarbon residue, to react with a hydroxy- or amino-compound of angularly fused tetranuclear hydrocarbon which, besides 6-carbon rings, comprises at most one 5-carbon ring and is free from methylene-groups; if desired, the products obtained may be treated with an agent which introduces substituents.

Among the anthraquinones of the above general formula are 1-alkylamino-4-halogenanthraquinones, for instance 1-methyl-, 1-dimethyl-, 1-ethyl- 1-butyl-amino-4-bromanthraquinone and the 1-methylamino-4-bromanthraquinone-orthosulfonic acid, also 1-amino 4-halogenanthraquinone- sulfonic acids, for instance 1-amino-4-bromanthraquinone-2-sulfonic acid, 1-amino-4-chloranthraquinone-2-sulfonic acid, 1-amino-4-bromo-anthraquinone-2:6-disulfonic acid and the derivatives alkylated in the amino-group, for instance methylated and ethylated, as well as arylated, for instance phenylated and naphthylated. Hydroxy- or amino-compounds of angularly fused tetranuclear hydrocarbons having in addition to 6-carbon rings at most one 5-carbon ring and free from methylene-groups are, for example hydroxypyrene-mono- and -polysulfonic acids, hydroxychrysene-mono- and -polysulfonic acids, aminopyrenes, aminopyrene-mono- and polysulfonic acids, aminochrysenes, diaminochrysenes, aminochrysene-mono- and -polysulfonic acids and diamino-chrysenesulfonic acids.

The reaction preferably occurs in aqueous or aqueous alcoholic solution with addition of an acid binding agent, for instance sodium bicarbonate or caustic soda lye and a catalyst, for instance copper bronze or a copper salt, accompanied by heating.

The products obtained may be treated with agents which introduce substituents, for example sulfonating agents (sulfuric acid monohydrate, fuming sulfuric acid); this is particularly advantageous when nonsulfonated parent materials are used.

The dyestuffs dye animal fibers, for instance wool and silk, various tints of very good fastness.

The following examples illustrate the invention, the parts being by weight:

Example 1

7.6 parts of 1-methylamino-4-bromanthraquinone, 5.6 parts of 3-aminopyrene, made by mono-nitrating pyrene and reducing the product, 4.6 parts of anhydrous sodium acetate and 1 part of copper acetate are together stirred in 100 parts of amyl alcohol for 10 hours at a temperature of 140–150° C. After cooling the mass is filtered and the solid matter washed with alcohol and then boiled with dilute hydrochloric acid to separate copper compounds. The product, when it has been extracted with boiling alcohol, is a dark black-green powder. It is stirred with 60 parts of sulfuric acid monohydrate for 16 hours at 50–55° C. and then the whole is introduced into ice and then filtered and washed. The residue on the filter is dissolved in dilute sodium carbonate solution, the solution is filtered from impurities, the filtrate is mixed with common salt, whereby the dyestuff is precipitated. It is filtered, washed and dried. The sulfonic acid of the dyestuff of the formula

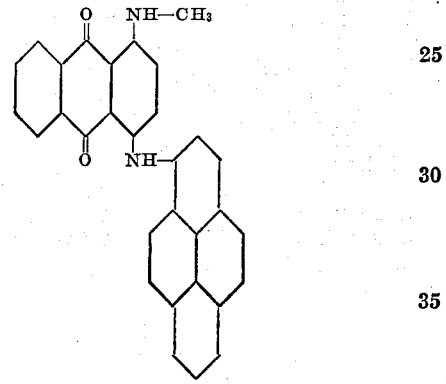

is an olive-green powder soluble in concentrated sulfuric acid to a blue solution and dyeing wool in an acid bath very fast olive-green tints.

Example 2

9.6 parts of sodium 1-amino-4-bromanthraquinone-2-sulfonate, 8 parts of sodium 3-aminopyrene-monosulfonate, made by sulfonating 3-aminopyrene, and 8 parts of sodium bicarbonate are together dissolved in 120 parts of water. 1.2 parts of cuprous chloride are added and the whole is stirred for 24 hours at 95–100° C. The solid matter is then filtered and washed with water until the filtrate is no longer green. On the filter there remains a violet dyestuff which may be purified by the dissolution in dilute hydrochloric acid and salting out. It is a violet powder soluble in concentrated sulfuric acid to a yellow solution and dyeing wool in an acid bath violet tints of good tinctorial strength.

The green filtrate, in which there is a second product constituting the main product of the reaction, is heated with dilute hydrochloric acid, mixed with common salt, allowed to cool and filtered. The solid matter is dissolved in dilute sodium carbonate solution, filtered from a small quantity of impurities and mixed with common salt; this fresh solid matter is filtered and washed with common salt solution of 10 per cent strength and dried. This dyestuff of the formula

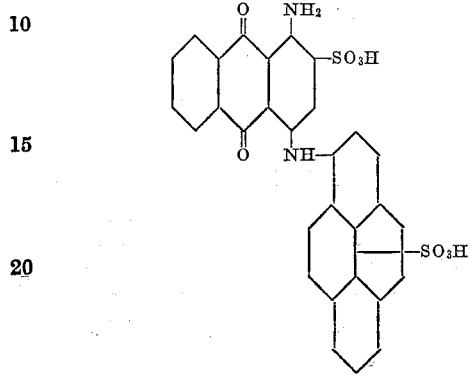

is a green powder soluble in concentrated sulfuric acid to a blue solution and dyeing wool in an acid bath very fast yellowish-green tints.

*Example 3*

4.8 parts of sodium 1-amino-4-bromanthraquinone-2-sulfonate, 4.1 parts of potassium 3-hydroxypyrene-monosulfonate, made from 3-hydroxypyrene and chlorosulfonic acid in nitrobenzene, and 4 parts of sodium bicarbonate are together dissolved in 60 parts of water. 0.6 part of cuprous chloride is added and the whole is stirred for 20 hours at 68–73° C. The cooled mass is filtered and the solid matter washed and dissolved in dilute hydrochloric acid; the solution is mixed with common salt, filtered and the dyestuff which has been precipitated is washed and dried. This dyestuff is a violet powder and dyes wool in an acid bath pure violet tints.

In the brown filtrate there is a second product of the reaction. The filtrate is mixed with common salt and the precipitated dyestuff is filtered, dissolved in hot water, again salted out, filtered and dried. In this manner there is obtained a brown dyestuff of the formula

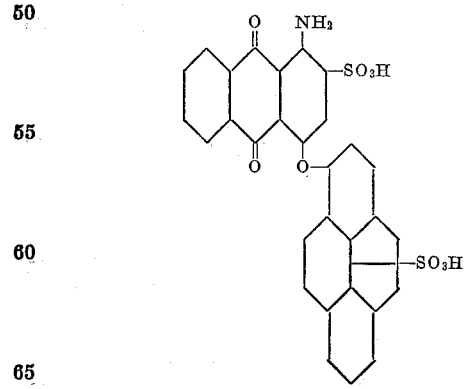

which is soluble in concentrated sulfuric acid to a green solution and dyeing wool in an acid bath orange-brown tints.

*Example 4*

4.8 parts of sodium 1-amino-4-bromanthraquinone-2-sulfonate, 2.6 parts of 3-aminopyrene made by mononitrating pyrene and reducing the product and 4 parts of sodium bicarbonate are suspended in 60 parts of water and 12 parts of alcohol, 0.6 part of cuprous chloride are added and the whole is stirred for 20 hours at 70–73° C. After diluting with water while it is still warm, the mixture is filtered and the solid matter washed first with water and then with alcohol. For purification this solid is extracted with boiling dilute hydrochloric acid, whereby a small quantity of a violet dyestuff passes into solution. The main quantity of the reaction product is, however, insoluble under these conditions and may be removed from the hydrochloric acid extract by filtration. It is a green powder of the formula

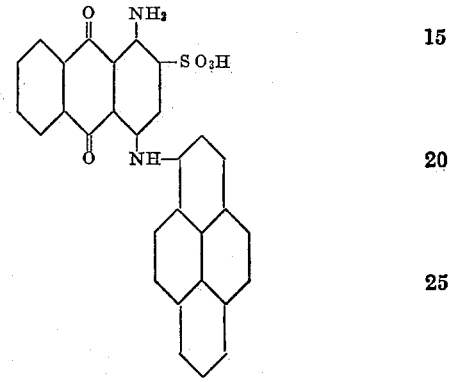

scarcely soluble in water. In concentrated sulfuric acid it dissolves to a red-violet solution; it dyes wool in an acid bath green tints.

Instead of 3-aminopyrene, 2-aminochrysene or 2:8-diaminochrysene may be used, in which case there are obtained products which dye wool in an acid bath violet to Bordeaux tints.

*Example 5*

9.6 parts of sodium 1-amino-4-bromanthraquinone-2-sulfonate, 8.6 parts of sodium 2-aminochrysene-monosulfonate, made by sulfonating 2-aminochrysene, 8 parts of sodium bicarbonate and 1.2 parts of cuprous chloride are introduced into 120 parts of water and the whole is stirred for 20 hours at 70–73° C. After cooling, the mass is filtered and the solid matter extracted with boiling water, whereby a product forming blue-green solution is dissolved and is separated by filtration from the undissolved matter. The latter, which is present in small proportion, is a violet powder soluble in concentrated sulfuric acid to a yellow solution and dyeing wool in an acid bath violet tints. In the blue-green filtrate a second product of the reaction is found in larger proportion. The filtrate is mixed with hydrochloric acid, boiled, filtered and the dyestuff is dissolved in hot sodium carbonate solution; the solution is filtered from impurities and the dyestuff of the formula

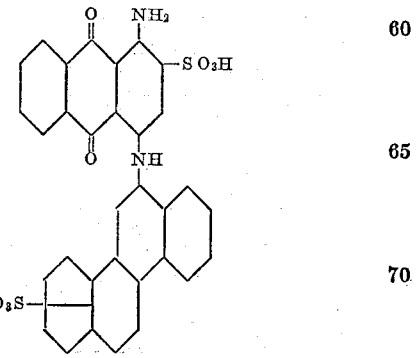

salted out. It is a black-green powder soluble in concentrated sulfuric acid to a blue-violet solution and dyeing wool in an acid bath strong, pure and fast blue-green tints.

*Example 6*

4.8 parts of sodium 1-amino-4-bromanthraquinone-2-sulfonate, 4.2 parts of sodium 2-hydroxychrysenesulfonate, made from 2-hydroxychrysene and chlorosulfonic acid in nitrobenzene, 4 parts of sodium bicarbonate and 0.6 part of cuprous chloride are introduced into 60 parts of water and the whole is stirred for 20 hours at 68–73° C. After cooling, the solid matter is filtered and washed. It is a violet dyestuff which may be purified by dissolution in dilute hydrochloric acid and salting out. It is a violet-brown powder and dyes wool in an acid bath violet tints. In the brown filtrate there is a second product of the reaction. This is precipitated by salting out and filtered. For purification the dyestuff of the formula

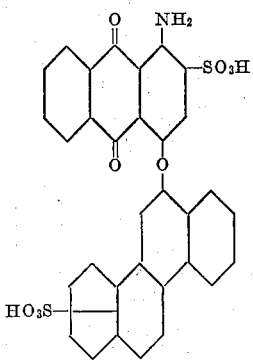

may be dissolved in water and again salted out. In this manner there is obtained a brown powder soluble in concentrated sulfuric acid to a green-yellow solution and dyeing wool in an acid bath orange-brown tints.

What I claim is:

1. Process for the manufacture of dyestuffs of the anthraquinone series, comprising causing anthraquinones of the general formula

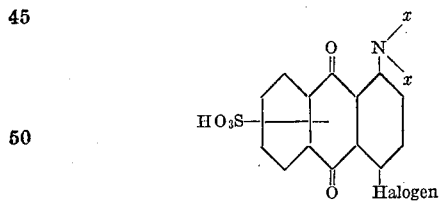

wherein the two $x$'s represent substituents selected from the group consisting of hydrogen, alkyl and aryl, to react with sulfonated hydrocarbons selected from the group consisting of chrysene and pyrene which contain a substituent selected from the group consisting of hydroxyl and amino-groups.

2. Process for the manufacture of dyestuffs of the anthraquinone series, comprising causing anthraquinones of the general formula

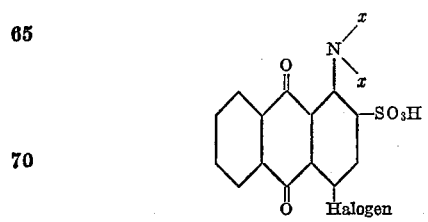

wherein the two $x$'s represent substituents selected from the group consisting of hydrogen, alkyl and aryl, to react with sulfonated hydrocarbons selected from the group consisting of chrysene and pyrene which contain a substituent selected from the group consisting of hydroxyl and amino-groups.

3. Process for the manufacture of dyestuffs of the anthraquinone series, comprising causing anthraquinones of the general formula

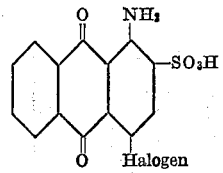

to react with sulfonated hydrocarbons selected from the group consisting of chrysene and pyrene which contain a substituent selected from the group consisting of hydroxyl and amino-groups.

4. Process for the manufacture of dyestuffs of the anthraquinone series, comprising causing anthraquinones of the general formula

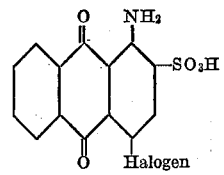

to react with amino-chrysene-mono-sulfonic acid.

5. Process for the manufacture of dyestuffs of the anthraquinone series, comprising causing anthraquinones of the general formula

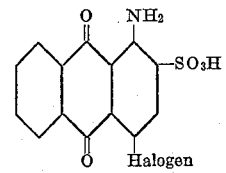

to react with amino-pyrene-mono-sulfonic acid.

6. Dyestuffs of the anthraquinone series of the general formula

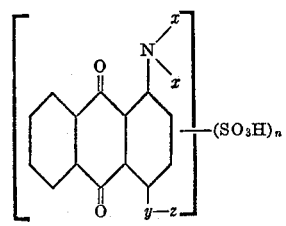

wherein the two $x$'s represent substituents selected from the group consisting of hydrogen, alkyl and aryl, $y$ represents a substituent selected from the group consisting of oxygen and —NH—, $z$ represents the radical of a hydrocarbon selected from the group consisting of chrysene and pyrene, and wherein $n$ represents the numbers 1 to 3.

7. Dyestuffs of the anthraquinone series of the general formula

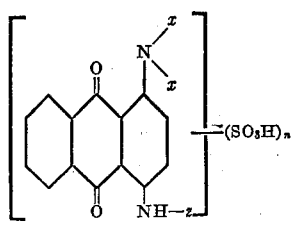

wherein the two $x$'s represent selected from the group consisting of hydrogen, alkyl and aryl, $z$ represents the radical of a hydrocarbon selected from the group consisting of chrysene and pyrene, and $n$ represents the numbers 1 to 3.

8. Dyestuffs of the anthraquinone series of the general formula

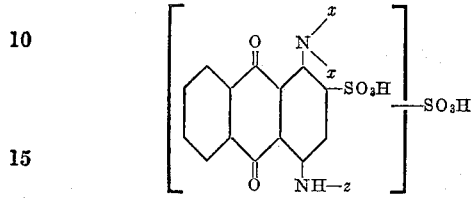

wherein the two $x$'s represent substituents selected from the group consisting of hydrogen, alkyl and aryl, and $z$ represents the radical of a hydrocarbon selected from the group consisting of chrysene and pyrene.

9. Dyestuffs of the anthraquinone series of the general formula

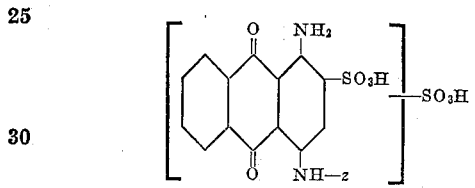

wherein $z$ represents the radical of a hydrocarbon selected from the group consisting of chrysene and pyrene.

10. Dyestuffs of the anthraquinone series of the formula

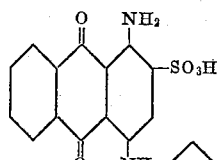

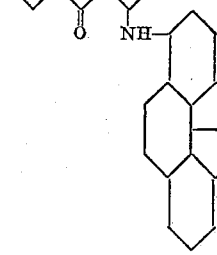

11. Dyestuffs of the anthraquinone series of the formula

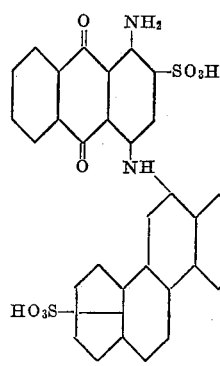

WALTER KERN.